US005455572A

United States Patent [19]
Cannon et al.

[11] Patent Number: 5,455,572
[45] Date of Patent: Oct. 3, 1995

[54] SELECTIVE CALL RECEIVER WITH COMPUTER INTERFACE MESSAGE NOTIFICATION

[75] Inventors: Gregory L. Cannon, Delray Beach; William J. Macko, West Palm Beach; Gregory W. Fuller, Boca Raton; Nancy E. Mondrosch, Boynton Beach, all of Fla.

[73] Assignee: Motorola, Inc., Schaumburg, Ill.

[21] Appl. No.: 963,345

[22] Filed: Oct. 19, 1992

[51] Int. Cl.$^6$ ........................................ H04Q 7/00
[52] U.S. Cl. .......................... 340/825.44; 364/705.05; 340/311.1
[58] Field of Search .......................... 340/825.44, 311.1; 364/705.01, 705.05, 715.1

[56] References Cited

U.S. PATENT DOCUMENTS

| | | | |
|---|---|---|---|
| 4,518,961 | 5/1985 | Davis et al. | 340/825.44 |
| 4,972,457 | 11/1990 | O'Sullivan | 379/59 |
| 5,043,721 | 8/1991 | May | 340/825.44 |
| 5,183,404 | 2/1993 | Aldons et al. | 439/55 |
| 5,302,947 | 4/1994 | Fuller et al. | 340/825.44 |

OTHER PUBLICATIONS

PC Card Standard Release 2.0, Personal Computer Memory Card International Association, Sep. 1991.

*Primary Examiner*—Donald J. Yusko
*Assistant Examiner*—Edward Merz
*Attorney, Agent, or Firm*—Gregg E. Rasor

[57] ABSTRACT

A selective call messaging peripheral (100) capable of receiving at least one message and communicating it to an electronic information processing device (200) comprises a microcontroller (105) including a processor (106) for executing a microcode program that controls operation of the peripheral and a receiver (103) that operates to receive and demodulate an information signal to provide a recovered information signal including an address signal and the message. A correlator (109) compares the recovered address signal with a predetermined address and generates an address detection indicating selection of the peripheral. A Personal Computer Memory Card Interface Association (PCMCIA) memory only interface (119) communicates notification of address detection to the electronic information processing device (200), and in response to a message read command received from the electronic information processing device (200), the microcontroller (105) configures the PCMCIA interface (119) to permit the electronic information processing device (200) to read the message from the peripheral (100).

3 Claims, 6 Drawing Sheets

| Pin | Signal | I/O | Function | +/- |
|---|---|---|---|---|
| 1 | GND | | Ground | |
| 2 | D3 | I/O | Data bit 3 | |
| 3 | D4 | I/O | Data bit 4 | |
| 4 | D5 | I/O | Data bit 5 | |
| 5 | D6 | I/O | Data bit 6 | |
| 6 | D7 | I/O | Data bit 7 | |
| 7 | CE1 | I | Card enable | - |
| 8 | A10 | I | Address bit 10 | |
| 9 | OE | I | Output enable | - |
| 10 | A11 | I | Address bit 11 | |
| 11 | A9 | I | Address bit 9 | |
| 12 | A8 | I | Address bit 8 | |
| 13 | A13 | I | Address bit 13 | |
| 14 | A14 | I | Address bit 14 | |
| 15 | WE/PGM | I | Write enable | - |
| 16 | RDY/BSY | O | Ready/Busy | +/- |
| 17 | Vcc | | Power Supply | |
| 18 | Vpp1 | | Programming and Peripheral Supply | |
| 19 | A16 | I | Address bit 16 | |
| 20 | A15 | I | Address bit 15 | |
| 21 | A12 | I | Address bit 12 | |
| 22 | A7 | I | Address bit 7 | |
| 23 | A6 | I | Address bit 6 | |
| 24 | A5 | I | Address bit 5 | |
| 25 | A4 | I | Address bit 4 | |
| 26 | A3 | I | Address bit 3 | |
| 27 | A2 | I | Address bit 2 | |
| 28 | A1 | I | Address bit 1 | |
| 29 | A0 | I | Address bit 0 | |
| 30 | D0 | I/O | Data bit 0 | |
| 31 | D1 | I/O | Data bit 1 | |
| 32 | D2 | I/O | Data bit 2 | |
| 33 | WP | O | Write protect | - |
| 34 | GND | | Ground | |

*FIG. 3*

| Pin | Signal | I/O | Function | +/- |
|---|---|---|---|---|
| 35 | GND | | Ground | |
| 36 | CD1 | O | Card Detect | - |
| 37 | D11 | I/O | Data bit 11 | |
| 38 | D12 | I/O | Data bit 12 | |
| 39 | D13 | I/O | Data bit 13 | |
| 40 | D14 | I/O | Data bit 14 | |
| 41 | D15 | I/O | Data bit 15 | |
| 42 | CE2 | I | Card enable | - |
| 43 | RFSH | I | Refresh | |
| 44 | RFU | | Reserved | |
| 45 | RFU | | Reserved | |
| 46 | A17 | I | Address bit 17 | |
| 47 | A18 | I | Address bit 18 | |
| 48 | A19 | I | Address bit 19 | |
| 49 | A20 | I | Address bit 20 | |
| 50 | A21 | I | Address bit 21 | |
| 51 | Vcc | | Power Supply | |
| 52 | Vpp2 | | Programming and Peripheral Supply 2 | |
| 53 | A22 | I | Address bit 22 | |
| 54 | A23 | I | Address bit 23 | |
| 55 | A24 | I | Address bit 24 | |
| 56 | A25 | I | Address bit 25 | |
| 57 | RFU | | Reserved | |
| 58 | RESET | I | Card Reset | + |
| 59 | WAIT | O | Extend bus cycle | - |
| 60 | RFU | | Reserved | - |
| 61 | REG | I | Register select | - |
| 62 | BVD2 | O | Battery voltage detect 2 | |
| 63 | BVD1 | O | Battery voltage detect 1 | |
| 64 | D8 | I/O | Data bit 8 | |
| 65 | D9 | I/O | Data bit 9 | |
| 66 | D10 | I/O | Data bit 10 | |
| 67 | CD2 | O | Card detect | - |
| 68 | GND | | Ground | |

*FIG. 4*

SELECTIVE CALL RECEIVER WITH COMPUTER INTERFACE MESSAGE NOTIFICATION

FIELD OF THE INVENTION

This invention relates in general to a Personal Computer Memory Card Interface Association (PCMCIA) peripheral and more particularly to a PCMCIA peripheral with selective call messaging capability.

BACKGROUND OF THE INVENTION

Selective call communication (paging) systems typically comprise a radio frequency transmitter/encoder (base station) that is accessed via a link to the Public Switched Telephone Network (PSTN) and a radio receiver (e.g., a selective call receiver or the like) that has at least one unique call address associated therewith. Operationally, the selective call receiver receives and decodes information transmitted from the base station, the information including an address and possibly a data or voice message. When the selective call receiver detects its address, it may alert a user and present message information received.

To implement messaging capability in a paging system, the address and message information referred to are encoded and subsequently transmitted using a protocol such as GSC (Motorola's Golay Sequential Code) or POCSAG (a code from Great Britain's Post Office Code Standardisation Advisory Group). These protocols are adapted to reliably communicate messages to at least one selective call receiver and are well known to one of ordinary skill in the art of paging systems. A typical selective call message may consist of an address signal if the message is a tone only message, or an address signal and a data packet if the message is a data message.

Present selective call receivers operate almost exclusively in a standalone fashion, that is, received messages can only be presented by the receiver's display. Some conventional selective call receivers include a serial data interface for communicating a single received message to an alternate presentation device such as a printer or possibly an electronic advertising sign. Presently, state of the art selective call receiver serial communication systems use a three wire serial interface operating at data rates from 300 to 9600 baud. This serial architecture inherently limits the data bandwidth (speed and information content) between the receiver and a data device. Moreover, since the three wire interface has only transmit data, receive data, and ground connections, any control signals must be encoded as serial data symbols, further slowing response time and limiting the data bandwidth. Lastly, since these interfaces are proprietary in nature, that is, there is no standard for signal levels, data rates, or protocols, data interchange between devices of different manufacturers is all but impossible because of a lack of convention.

Consequently, what is needed is a standardized communication interface for state of the art selective call receiver systems that provides a capability to effectively communicate received information to a microcomputer or the like.

SUMMARY OF THE INVENTION

Briefly, according to the invention, there is provided a selective call messaging peripheral capable of receiving at least one message and communicating it to an electronic information processing device. The peripheral comprises a microcontroller including a processor for executing a microcode program that controls operation of the selective call messaging peripheral and a receiver that operates to receive and demodulate an information signal to provide a recovered information signal including an address signal and the at least one message. A correlator compares the recovered address signal with a predetermined address associated with the selective call messaging peripheral and generates an address detection when the recovered and predetermined addresses are substantially equivalent, indicating selection of the selective call messaging peripheral. A PCMCIA memory only interface communicates notification of address detection to the electronic information processing device, and in response to a message read command received from the electronic information processing device, the microcontroller configures the PCMCIA interface to permit the electronic information processing device to read the at least one message from the selective call messaging peripheral.

BRIEF DESCRIPTION OF THE DRAWINGS

FIG. 3 illustrates a first portion of a PCMCIA memory only interface table listing signals used for communication between the selective call messaging peripheral and electronic information processing device.

FIG. 4 illustrates a second portion of a PCMCIA memory only interface table listing signals used for communication between the selective call messaging peripheral and electronic information processing device.

DESCRIPTION OF A PREFERRED EMBODIMENT

Figure 1:
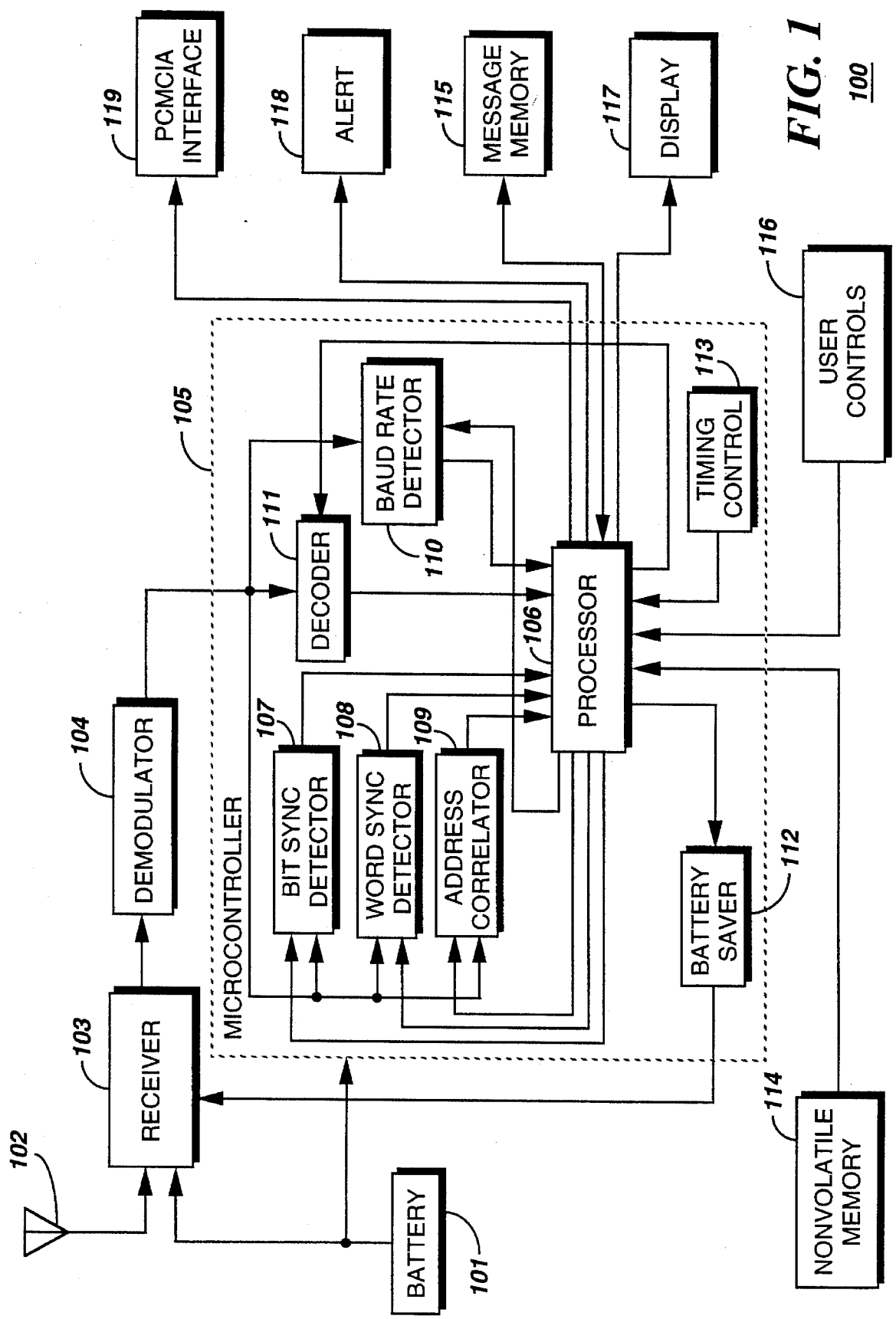
FIG. 1 is a block diagram of a selective call messaging peripheral having a PCMCIA memory only interface.

Referring to FIG. 1, a battery 101 powered selective call messaging peripheral 100 operates to receive an information signal via an antenna 102. A receiver 103 couples the received information signal to a conventional demodulator 104 that is capable of recovering analog or digital information. Received digital information is recovered as a serial bit stream that is then coupled to a microcontroller 105 for interpreting and decoding the serial bit stream as address, control, and data signals. In the preferred embodiment, the microcontroller 105 may comprise a processor 106, a bit synchronization detector 107, a word synchronization detector 108, an address correlator 109, a baud rate detector 110, a data decoder 111, a battery saving control circuit 112, and a timing control 113, implemented in hardware, software, or a combination thereof. Examples of commercially available microcontrollers suitable for implementing the preferred embodiment of the present invention are Motorola's MC68HC05xx or M68HC11xx. Complete descriptions of these devices are available in Motorola's data book set entitled "Microprocessor, Microcontroller, and Peripheral Data," volumes I and II, Series A, © 1988 by MOTOROLA, INC.

More specifically, in the microcontroller 105 the serial bit stream is coupled to the baud rate detector 110 that determines a receiving data rate associated with the recovered information. When the receiving data rate is determined, the bit synchronization detector 107 establishes synchronization between the microcontroller's 105 data decoding components (106, 109, and 111) and the individual signals (e.g., address, control, and data signals) in the recovered information. Once bit synchronization is established, the word synchronization detector 108 searches the serial bit stream for information indicating the beginning of a batch or frame. When the microcontroller 105 has established both bit and word synchronization, the recovered information may be searched for a group identification code associated with the selective call receiver. When a group identification code is found corresponding to the selective call messaging peripheral, it will search only those code frames associated with the receiver's group for pages intended for the selective call messaging peripheral. During the period between like frames, the microcontroller 105 will preferably activate the battery saver 112 to "shut-down" the receiver 103 and demodulator 104, thereby conserving power and extending battery life. The interval between like frames is known in the art as a "sleep" period. Preferably, the system protocol operates such that pages targeted for a specific group identifier, and pages intended for a particular selective call messaging peripheral, are sent only during the transmission of that receiver's designated paging group, therefore, no pages are missed during the sleep period. A receiver that operates in this fashion is said to be in a "battery saving" mode.

In determining the selection of the particular selective call messaging peripheral, a correlation is performed between a predetermined address associated with the selective call receiver and a received address. To accomplish this, the address correlator 109, which comprises a signal processor, performs a comparison between the address signal recovered from the received information signal and a predetermined address associated with the selective call messaging peripheral, generating a detection indicating selection of the selective call messaging peripheral when the recovered address is substantially equivalent to the predetermined address. The predetermined address or addresses associated with the selective call messaging peripheral are preferably stored in the non-volatile memory 114 or code plug. Optionally, the non-volatile memory 114 may reside inside a support integrated circuit (not shown) or in the microcontroller 105. The non-volatile memory 114 typically has a plurality of registers for storing a plurality of configuration words that characterize the operation of the selective call messaging peripheral. When a detection is generated, the microcontroller 105 may generate an alert responsive to a selected alerting mode, e.g., a tone alert would be generated when a tone-only mode is selected. Alternatively, in response to a valid data address correlation and a corresponding detection, the decoder 111 operates to decode at least one selective call message from the received information signal and couples message information to the message memory 115.

In accordance with the recovered information, the programmed operating parameters stored in the non-volatile memory 114, and settings associated with the user controls 116, the selective call messaging peripheral may present at least a portion of the message information, such as by a display 117. Alternatively, the user may be alerted that a message has been received by an alert transducer 118 that generates an audible, visual, or tactile alert. The user may view received message information on the display 117 by manually activating an appropriate user control 116 such as a message read control 116.

The microcontroller 105 may also include items such as a conventional signal multiplexer, a voltage regulator and control mechanism, a current regulator and control mechanism, environmental sensing circuitry such as for light or temperature conditions, audio power amplifier circuitry, control interface circuitry, and display illumination circuitry. These elements are arranged in a known manner to configure the selective call messaging peripheral as requested by a customer.

Figure 2:
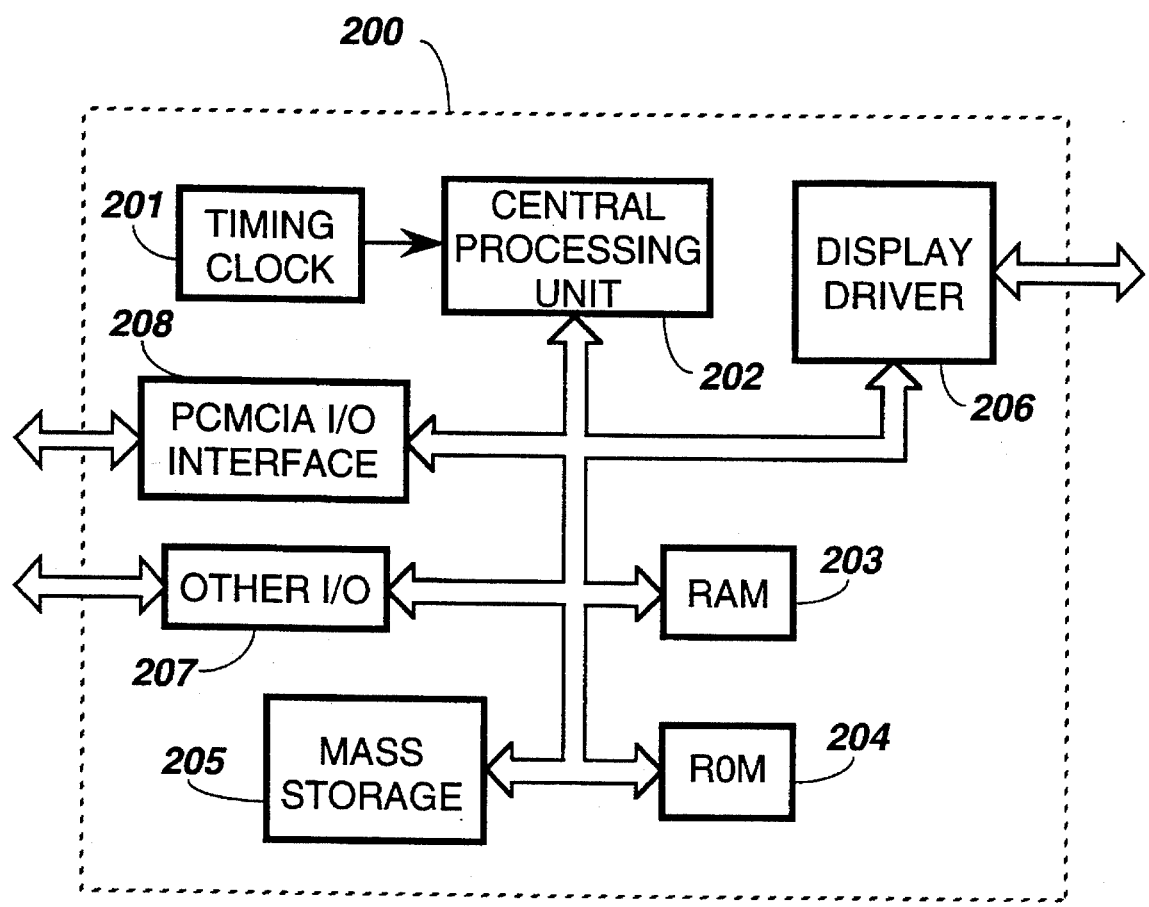
FIG. 2 is a block diagram of an electronic information processing device having a PCMCIA memory only interface.

In the preferred embodiment, upon receipt or storage of a selective call message, the microcontroller 105 may communicate the received message to an electronic information processing device (e.g., a host microcomputer or the like as illustrated in FIG. 2) via a PCMCIA interface 119. When coupled to the electronic information processing device 200, the selective call messaging peripheral 100 may operate to automatically deliver received messages in real time, or transfer stored messages to the electronic information processing device for storage, presentation, archival, or the like. Alternatively, a user may via a program executing on the electronic information processing device, download any messages previously received and stored by the selective call messaging peripheral 100 while in the standalone operating mode (separated from the electronic information processing device). In this way, the selective call messaging peripheral 100 gives a paging subscriber the option of operating as a conventional standalone paging receiver, that is, receiving, storing and displaying messages. It is for this reason that the selective call messaging peripheral 100 includes a message read control for recalling the at least one selective call message from the at least one electronic memory 115 for presentation. This allows a user to present the at least one selective call message recalled from the at least one electronic memory 115 on the display 117 in response to activating the message read control 116.

As can be appreciated by one of ordinary skill in the art, this invention can be realized in a number of embodiments of which the disclosed embodiment is only one of many equivalent alternatives.

Referring to FIG. 2, the illustration shows a electronic information processing device 200 having a PCMCIA interface configured for operation in accordance with the preferred embodiment of the present invention. As illustrated, the electronic information processing device 200 comprises a system timing clock 201, central processing unit 202, random access memory (RAM) 203, read only memory (ROM) 204, mass storage (e.g., a disk drive or the like) 205, display driver 206, general I/O interfaces 207, and a PCMCIA memory only interface 208. In the preferred embodiment, the electronic information processing device's PCMCIA memory only interface 208 couples to the selective call messaging peripheral's 100 PCMCIA interface 119. After coupling, messages received by the selective call messaging peripheral 100 may be communicated to the electronic information processing device 200 via the PCMCIA memory only interface 208 and directed to the electronic information processing device's RAM 203, mass storage 205, display driver 206 for presentation on an external display (not shown), or possibly to one of the general I/O interfaces 207 for routing to a printer or the like.

The system formed by coupling the elements depicted in FIG. 1 and FIG. 2 via a PCMCIA memory only interface realizes many advantages over prior art selective call messaging systems. Since the PCMCIA interface is a standard, the selective call messaging peripheral 100 need not be customized for operation with dissimilar host computers supporting the PCMCIA standard. This eliminates the problems associated with proprietary interface standards such as no standard for signal levels, data rates, or protocols, making data interchange between devices of different manufacturers is all but impossible. Another advantage of the PCMCIA interface implemented in the selective call messaging peripheral 100 over the conventional three wire serial communication systems is data throughput. Since the PCMCIA interface can accommodate 16 bit parallel data transfers, and includes DMA (direct memory access) capability, there is a significant increase in data bandwidth as opposed to a 9600 baud, 8 bit, asynchronous serial data link. Moreover, the PCMCIA interface implements dedicated control signals, and may even provide power for the selective call messaging peripheral 100.

Referring to FIG. 3 and FIG. 4, the illustrations show a first and a second portion of a PCMCIA memory only interface table listing signals used for communication between the PCMCIA selective call messaging peripheral and electronic information processing device in accordance with the preferred embodiment of the present invention.

The tables illustrated in FIG. 3 and FIG. 4 detail the PCMCIA memory only interface pinout and signal definitions. The PCMCIA memory only interface standard includes provisions for reading 16-bit data on the low-order 8 bit data bits (useful in conventional 8-bit host systems) and for the interpretation of status information returned by a PCMCIA peripheral card. The principal aspects of the PCMCIA card interface are byte addressability, random access to bytes of data, and the existence of a separate "register" attribute memory space selected by a REG signal. This allows an electronic information processing device to obtain highly detailed peripheral card information such as its manufacturer or a chip-type. The PCMCIA standard also allows access to control registers in configurable types of cards.

The standard PCMCIA interface depicted has a 64-Mbyte addressing capability and numerous hardware provisions to support the various memory technologies, including ROM, OTPROM, UV-EPROM, FLASH, SRAM and PSRAM. I/O-card support is provided in the PCMCIA I/O interface (not shown) by Interrupt, 16-bit cycle, IOread/IOwrite, INput ACK, Reset, Wait, Status Change, Enable and Power signals, some of which are dynamically redefined to these uses once an I/O card is recognized by the host.

All signals in the PCMCIA interface are grouped under four classifications: I (Input), O (Output), I/O (Bidirectional), and R (Reserved). Input signals are those driven by the electronic information processing device and output signals are those driven by the peripheral card.

The Memory-Only Interface supports memory cards, but does not contain signals which support I/O Cards. The preferred embodiment of the present invention implements the Memory-Only Interface as defined by PCMCIA. The signals +RDY/–BSY, WP, BVD1 and BVD2 are present on the Memory-Only Interface but are replaced by other signals when the I/O Interface is selected. The Memory-Only Interface is selected by default in both the socket and the card whenever a card is inserted into a socket, and immediately following the application of Vcc (power) or the RESET signal to a card. After a card's Card Information Structure (CIS) has been interpreted, the card and the socket may be configured, if appropriate, to use the I/O Interface.

PCMCIA peripheral cards may be configured by the electronic information processing device to change the way that their address space is accessed. Before configuring a card, the electronic information processing device must examine the card's CIS to determine the address space and other requirements of the possible card configurations. The electronic information processing device uses this information to select the best configuration from those available in the card, as determined by the electronic information processing device's hardware and software capabilities, as well as the requirements of other cards installed concurrently. Both the electronic information processing device and peripheral card may play a role in determining when the latter is selected. The card includes information in the CIS which tells the host the address decodings the card may be configured to perform. The host then programs the card to perform a particular decoding using the card's Configuration Registers.

The PCMCIA memory only interface signals illustrated in FIG. 3 and FIG. 4 are detailed in the following text along with their functions. Signals A0 through A25 are address-bus-input lines which enable direct address of up to 64 megabytes of memory on the card. Signals D0 through D15 constitute the bidirectional data bus. The -CE1 signal enables even-numbered-address bytes and -CE2 enables odd-numbered-address bytes. A multiplexing scheme based on A0, -CE1 and -CE2 allows 8-bit microcomputer hosts to access all data on D0 through D7 if needed. The -OE line is used to gate Memory Read data from the memory card. The -WE/-PGM input signal is used for strobing Memory Write data into a PCMCIA memory card. This line is also used for memory cards employing programmable memory technologies. A Ready/Busy function is provided by the +RDY/–BSY signals when the peripheral card and the microcomputer host socket are configured for the Memory-Only Interface. The -CD1 and -CD2 signals provide for proper detection of memory-card insertion. Their signal pins are located at opposite ends of the connector to ensure a valid detection (i.e., ensuring both sides of the card are firmly inserted). In a conventional implementation of the PCMCIA memory only interface, the -CD1 and -CD2 signals are connected to ground internally on the memory card and will be forced low whenever a card is placed in a host socket. The preferred embodiment of the present invention implements grounding of the -CD1 and -CD2 signals using electronic means such as an open collector transistor, an integrated circuit driver, or the like. This implementation allows the selective call messaging peripheral 100 to request service from the electronic information processing device 200 by toggling the state of the -CD1 and -CD2 lines, thereby "tricking" the electronic information processing device's PCMCIA interface driver into thinking that the selective call messaging peripheral was temporarily removed (disconnected) from the electronic information processing device 200. Since the PCMCIA interface driver as defined in the PCMCIA specification must interrogate a PCMCIA card when inserted (e.g., when ground is detected on the -CD1 and -CD2 lines), this procedure essentially allows a PCMCIA memory only interface card to request service from a host device in a fashion similar to an interrupt as defined in the PCMCIA I/O interface standard. The WP output signal is used to reflect the status of the card's Write Protect switch. The -REG signal is kept inactive for all Common Memory access. The signals BVD1 and BVD2 are generated by the memory card as an indication of the condition of its battery. The VPP1 and VPP2 signals supply programming voltages for programmable-memory operation, or additional supply voltages for Peripheral Cards. The Vcc and GND input pins are located at symmetrical positions on the memory card to provide safety in the case of an inverted-card insertion. The Refresh signal is intended for pseudostatic SRAMS (PSRAM). Several pins have been identified as Reserved for Future Use (RFU). The +RESET signal clears the Card Configuration Option Register thus placing a card in an unconfigured (Memory-Only Interface) state. It also signals the beginning of any additional card initialization. The −WAIT signal is asserted by a card to delay completion of the memory-access cycle in progress.

As can be seen from the preceding discussion, using a PCMCIA memory only interface in conjunction with a selective call receiver for message delivery to a electronic information processing device 200 yields distinct advantages in expanding the functionality of the selective call messaging peripheral 100. The interface is capable of adaptive configuration to both 8 and 16 bit wide bus architectures, as well as supporting other features such as low battery detection. A conventional serial interface cannot implement the wide array of features available in the PCMCIA interface standard. Even if some of the simpler features were implemented using a conventional serial interface, the implementation would require added complexity in terms of device and command handlers in both the host and peripheral systems and would not be able to achieve functional equivalence to a PCMCIA implementation.

Figure 5:
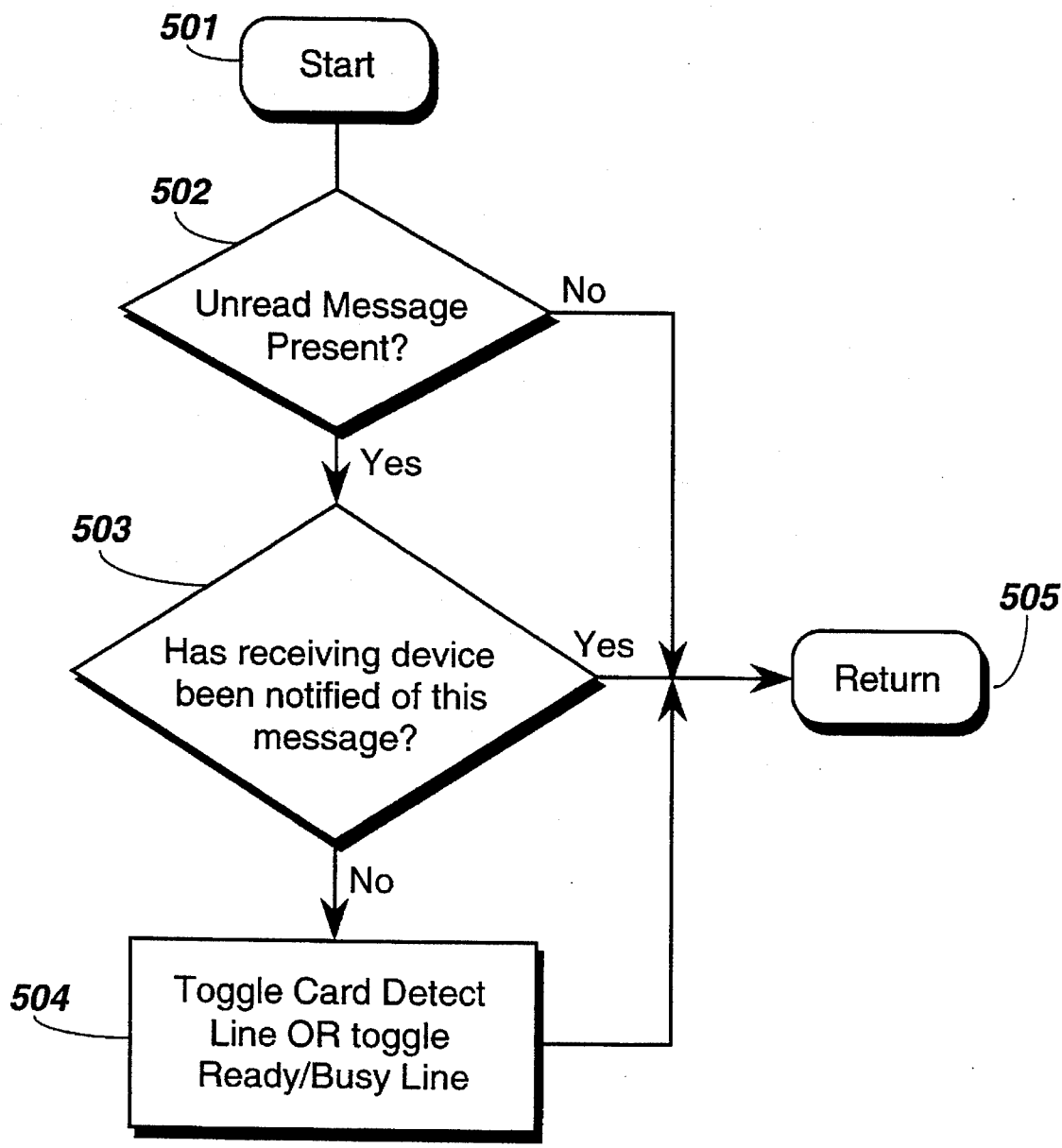
FIG. 5 is a flow diagram illustrating a procedure for the selective call messaging peripheral to notify the electronic information processing device of a message receipt.

Referring to FIG. 5, the flow diagram illustrates a procedure for the selective call messaging peripheral to notify the electronic information processing device of a message receipt in accordance with the preferred embodiment of the present invention. When a selective call message is received by the selective call messaging peripheral 501, an unread message is stored and step 502 passes control to step 503. Step 503 test for notification of the electronic information processing device. If the device has not been notified, the selective call messaging peripheral communicates notification of the address detection to the electronic information processing device 504. Notification can be effected in two ways. In a first embodiment, the electronic information processing device is notified by simulating disengagement of the PCMCIA memory only interface between the selective call messaging peripheral and the electronic information processing device, the simulated disengagement causing the electronic information processing device to issue the message read command to the selective call messaging peripheral. The simulation is accomplished by changing an impedance present at a connection corresponding with at least one card detect signal (e.g., the -CD1 and -CD2 lines) on the selective call messaging peripheral's PCMCIA memory only interface from a first electrical state approximating a zero impedance reference with respect to a relative ground reference potential for the PCMCIA memory only interface to a second electrical state approximating an infinite impedance and then returning the impedance to the first electrical state. In a second embodiment, the electronic information processing device is notified by executing a sequence that asserts a PCMCIA busy signal in the selective call messaging peripheral's PCMCIA memory only interface, then releases the PCMCIA busy signal and asserts a PCMCIA ready signal in the selective call messaging peripheral's PCMCIA memory only interface, the sequence causing the electronic information processing device to issue the message read command to the selective call messaging peripheral. In each embodiment, the final result is that the electronic information processing device is notified of an unread message received and the message is made available for transfer to and processing by the electronic information processing device. When message processing is complete, control is returned to the selective call messaging peripheral's main control program 505.

Figure 6:
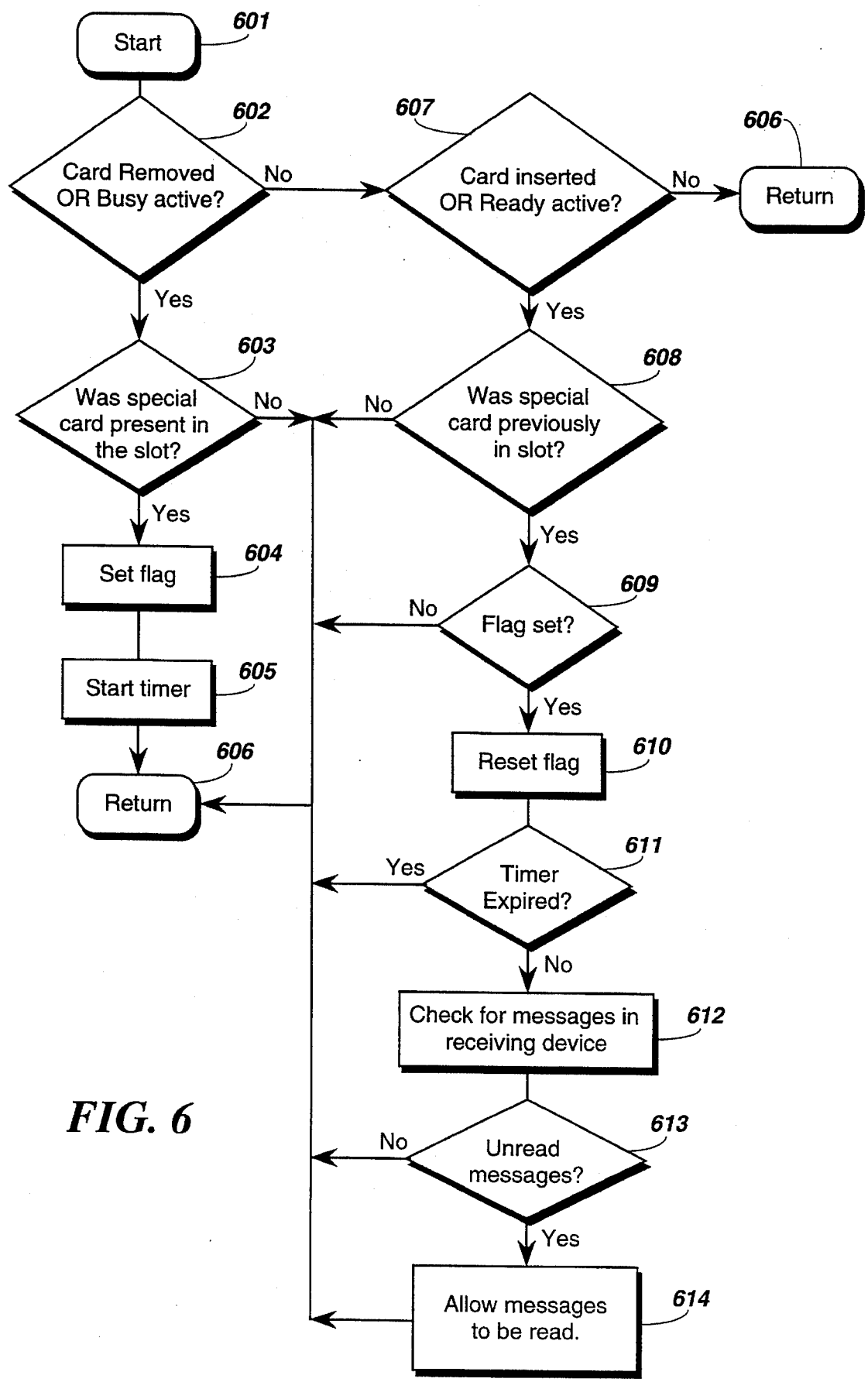
FIG. 6 is a flow diagram illustrating a procedure for the electronic information processing device to respond when notified of the message receipt by the selective call messaging peripheral.

Referring to FIG. 6, the flow diagram illustrates a procedure for the electronic information processing device to respond when notified of the message receipt by the selective call messaging peripheral in accordance with the preferred embodiment of the present invention. The procedure starts 601 and checks for either the card detect signal being false (indicating the card has been removed) or the PCMCIA memory only interface busy signal being asserted 602. If either of these conditions are affirmed, step 603 determines if a "special" card (e.g., a selective call messaging peripheral card or the like) was present in the PCMCIA memory only interface slot. If the special card was present, a flag indicating its presence is set 604, a time-out timer started 605, and control is returned to the electronic information processing device's main control program 606. After determining that a selective call messaging peripheral card has been removed and reinserted (or the PCMCIA interface signals CD1, CD2, indicate such an event has occurred) 602, 603 and that a special card was present in the PCMCIA memory only interface slot 609, and that the flag indicating a card was present is set 609, the flag is reset 610 and the time-out time checked to prevent a false indication of unread messages. If the timer had not expired, the electronic information processing device issues a message read command to the selective call messaging peripheral card via the memory only PCMCIA interface 612. If there are unread messages 613, the electronic information processing device addresses the selective call messaging peripheral card and may read the unread messages into its RAM, store them in its mass storage, or present them on its display. When message processing is complete, control is returned to the electronic information processing device's main control program 606.

What is claimed is:

1. A selective call messaging peripheral capable of receiving at least one message and communicating the at least one message to an electronic information processing device, the selective call messaging peripheral comprising:

a microcontroller including a processor for executing a microcode program that controls operation of the selective call messaging peripheral;

a receiver coupled to the microcontroller, the receiver operating to receive and demodulate an information signal providing a recovered information signal including an address signal and the at least one message;

a correlator coupled to the receiver, the correlator performing a comparison between the address signal recovered from the received information signal and a predetermined address associated with the selective call messaging peripheral and generating an address detection when the recovered address is substantially equivalent to the predetermined address indicating selection of the selective call messaging peripheral; and a PCMCIA memory only interface coupled to and controlled by the microcontroller, the PCMCIA memory only interface communicating notification of the address detection to the electronic information processing device using a sequence that asserts a PCMCIA busy signal in the selective call messaging peripheral's PCMCIA memory only interface, then releases the PCMCIA busy signal and asserts a PCMCIA ready signal in the selective call messaging peripheral's PCMCIA memory only interface, the sequence causing the electronic information processing device to issue the message read command to the selective call messaging peripheral, and in response to receiving a message read command from the electronic information processing device, the PCMCIA memory only interface is configured by the microcontroller to permit the electronic information processing device to read the at least one message from the selective call messaging peripheral.

2. A selective call receiver capable of receiving at least one selective call message and communicating the at least one selective call message to an electronic information processing device, the selective call receiver comprising:

a microcontroller including a processor for executing a microcode program that controls operation of the selective call receiver;

a receiver coupled to and controlled by the microcontroller, the receiver being capable of receiving and demodulating an information signal to provide a recovered information signal;

a detector for recovering a serial bit stream from the recovered information signal, the serial bit stream comprising an address signal, an address correlator responsive to the address signal, the address correlator operating to generate an address detection when the recovered address is substantially equivalent to a predetermined address indicating selection of the selective call receiver;

a decoder operating to decode the at least one selective call message from the recovered information signal and store the at least one selective call message in at least one electronic memory in response to the detection;

a PCMCIA memory only interface coupled to and controlled by the microcontroller, the PCMCIA memory only interface communicating notification of the address detection to the electronic information processing device, and in response to receiving a message read command from the electronic information processing device using a sequence that asserts a PCMCIA busy signal in the selective call messaging peripheral's PCMCIA memory only interface, then releases the PCMCIA busy signal and asserts a PCMCIA ready signal in the selective call messaging peripheral's PCMCIA memory only interface, the sequence causing the electronic information processing device to issue the message read command to the selective call messaging peripheral, the PCMCIA memory only interface is configured by the microcontroller to permit the electronic information processing device to read the at least one message from the selective call receiver.

3. A selective call messaging peripheral capable of receiving at least one message and communicating the at least one message to an electronic information processing device, the selective call messaging peripheral comprising:

a microcontroller including a processor for executing a microcode program that controls operation of the selective call messaging peripheral;

a receiver coupled to the microcontroller, the receiver operating to receive and demodulate an information signal providing a recovered information signal including an address signal and the at least one message;

a correlator coupled to the receiver, the correlator performing a comparison between the address signal recovered from the received information signal and a predetermined address associated with the selective call messaging peripheral and generating an address detection when the recovered address is substantially equivalent to the predetermined address indicating selection of the selective call messaging peripheral; and a PCMCIA memory only interface coupled to the microcontroller, the microcontroller operating to take control of and configure the PCMCIA memory only interface in response to the address detection, the PCMCIA memory only interface serving to convey notification of the address detection to the electronic information processing device using a sequence that asserts a PCMCIA busy signal in the selective call messaging peripheral's PCMCIA memory only interface, then releases the PCMCIA busy signal and asserts a PCMCIA ready signal in the selective call messaging peripheral's PCMCIA memory only interface, the sequence causing the electronic information processing device to issue the message read command to the selective call messaging peripheral, and allow the electronic information processing device to read the at least one message from the selective call messaging peripheral.

* * * * *